United States Patent [19]

Aldridge et al.

[11] 4,313,818
[45] Feb. 2, 1982

[54] HYDROCRACKING PROCESS UTILIZING HIGH SURFACE AREA CATALYSTS

[75] Inventors: Clyde L. Aldridge; Roby Bearden, Jr., both of Baton Rouge, La.

[73] Assignee: Exxon Research & Engineering Co., Florham Park, N.J.

[21] Appl. No.: 105,249

[22] Filed: Dec. 19, 1979

Related U.S. Application Data

[60] Division of Ser. No. 955,526, Oct. 30, 1978, Pat. No. 4,244,839, which is a continuation-in-part of Ser. No. 847,898, Nov. 2, 1977, Pat. No. 4,134,825, which is a continuation-in-part of Ser. No. 702,227, Jul. 2, 1976, abandoned.

[51] Int. Cl.$^3$ .............................................. C10G 47/06
[52] U.S. Cl. .................................. 208/108; 208/110; 208/112; 208/113; 208/136; 252/477 R; 423/652
[58] Field of Search .................. 208/108, 112, 110, 59

[56] References Cited

U.S. PATENT DOCUMENTS

| | | | |
|---|---|---|---|
| 1,876,270 | 9/1932 | Zorn | 252/431 R |
| 2,091,831 | 8/1937 | Pongratz et al. | 208/108 |
| 3,131,142 | 4/1964 | Mills | 208/108 |
| 3,161,585 | 12/1964 | Gleim et al. | 208/264 |
| 3,331,769 | 7/1967 | Gatsis | 208/216 R |
| 3,657,111 | 4/1972 | Gleim | 208/215 |
| 4,032,435 | 6/1977 | Schmitt et al. | 208/216 PP |
| 4,226,742 | 10/1980 | Bearden et al. | 252/431 C |
| 4,244,839 | 1/1981 | Aldridge et al. | 252/431 C |

*Primary Examiner*—Delbert E. Gantz
*Assistant Examiner*—G. E. Schmitkons
*Attorney, Agent, or Firm*—Marthe L. Gibbons

[57] ABSTRACT

A hydrocracking process is provided utilizing high surface area metal-containing catalysts prepared by dispersing a thermally decomposable metal compound in a hydrocarbon oil having a Conradson carbon content of up to about 50 weight percent, the thermally decomposable metal compound being added in an amount sufficient to obtain a specified ratio of atoms of Conradson carbon of the oil chargestock to atoms of metal constituent of the thermally decomposable compound, heating the compound in the presence of a gas comprising either hydrogen or hydrogen sulfide or hydrogen and hydrogen sulfide to form a solid high surface area catalyst. The metal constituent of the thermally decomposable metal compound may be a metal of Groups II, III, IV, V, VIB, VIIB, VIII or mixtures thereof.

9 Claims, 3 Drawing Figures

FIGURE 1

HYDROCRACKING PROCESS UTILIZING HIGH SURFACE AREA CATALYSTS

CROSS REFERENCE TO RELATED APPLICATIONS

This is a division, of application Ser. No. 955,526, filed Oct. 30, 1978 (now U.S. Pat. No. 4,244,839), which is a continuation-in-part of U.S. application Ser. No. 847,898, filed Nov. 2, 1977 (now U.S. Pat. No. 4,134,825), which is a continuation-in-part of U.S. Pat. application Ser. No. 702,227, filed July 2, 1976, now abandoned, the teachings of both of which are hereby incorporated by specific reference.

BACKGROUND OF THE INVENTION

1. Field of the Invention

This invention relates to the preparation of high surface area catalysts and catalyst supports and their use in hydrocarbon treating processes and chemical processes.

2. Description of the Prior Art

Hydrorefining processes utilizing dispersed catalysts in admixture with a hydrocarbonaceous oil are well known. The term "hydrorefining" is intended herein to designate a catalytic treatment, in the presence of hydrogen, of a hydrocarbonaceous oil to upgrade the oil by eliminating or reducing the concentration of contaminants in the oil such as sulfur compounds, nitrogenous compounds, metal contaminants and/or to convert at least a portion of the heavy constituents of the oil such as asphaltenes or coke precursors to lower boiling hydrocarbon products, and to reduce the Conradson carbon residue of the oil.

U.S. Pat. No. 3,161,585 discloses a hydrorefining process in which a petroleum oil chargestock containing a colloidally dispersed catalyst selected from the group consisting of a metal of Groups VB and VIB, an oxide of said metal and a sulfide of said metal is reacted with hydrogen at hydrorefining conditions. This patent teaches that a concentration of the dispersed catalyst, calculated as the elemental metal, in the oil chargestock is from about 0.1 weight percent to about 10 weight percent of the initial chargestock.

U.S. Pat. No. 3,331,769 discloses a hydrorefining process in which a metal component (Group VB, Group VIB, iron group metal) colloidally dispersed in a hydrocarbonaceous oil is reacted in contact with a fixed bed of a conventional supported hydrodesulfurization catalyst in the hydrorefining zone. The concentration of the dispersed metal component which is used in the hydrorefining stage in combination with the supported catalyst ranges from 250 to 2500 weight parts per million (wppm).

U.S. Pat. No. 3,657,111 discloses a process for hydrorefining an asphaltene-containing hydrocarbon chargestock which comprises dissolving in the chargestock a hydrocarbon-soluble oxovanadate salt and forming a colloidally dispersed catalytic vanadium sulfide in situ within the chargestock by reacting the resulting solution, at hydrorefining conditions, with hydrogen and hydrogen sulfide.

U.S. Pat. No. 3,131,142 discloses a slurry hydrocracking process in which an oil soluble dispersible compound of Groups IV to VIII is added to a heavy oil feed. The catalyst is used in amounts ranging from 0.1 to 1 weight percent, calculated as the metal, based on the oil feed.

U.S. Pat. No. 1,876,270 discloses the use of oil soluble organometallic compounds in thermal cracking or in destructive hydrogenation (hydrocracking) of hydrocarbons to lower boiling products.

U.S. Pat. No. 2,091,831 discloses cracking or destructive hydrogenation carried out in the presence of oil soluble salts of acid organic compounds selected from the group consisting of carboxylic acids and phenols with a metal of Group VI and Group VIII of the Periodic Table. The oil soluble salt is used in amounts between 4 and 20 weight percent based on the feed.

It has now been found that high surface area catalysts can be prepared by adding a thermally decomposable metal compound catalyst precursor to a hydrocarbon oil having a Conradson carbon content up to about 50 weight percent, converting the catalyst precursor to a catalyst within the oil feed and recovering the resulting high surface area catalyst.

SUMMARY OF THE INVENTION

In accordance with the invention there is provided, a high surface area catalyst prepared by the steps which comprise: (a) adding to a hydrocarbon oil charge-stock having a Conradson carbon content up to about 50 weight percent, a thermally decomposable metal compound in an amount sufficient to provide a ratio of atoms of oil chargestock Conradson carbon to atoms of metal constituent of said thermally decomposable metal compound of less than about 750 to 1, said metal constituent being selected from the group consisting of Group II, Group III, Group IV, Group V, Group VIB, Group VIIB and Group VIII of the Periodic Table of Elements and mixtures thereof; (b) heating said thermally decomposable metal compound within said chargestock at an elevated temperature in the presence of a gas selected from the group consisting of a hydrogen-containing gas, a hydrogen sulfide-containing gas, and a gas comprising hydrogen and hydrogen sulfide to produce a solid high surface area catalyst with said chargestock, and (c) recovering said high surface area catalyst.

By the expression "ratio of atoms of Conradson carbon of the oil chargestock to atoms of metal constituent" is intended herein the following relation:

$$\frac{\frac{\text{weight of Conradson carbon residue}}{12}}{\frac{\text{weight of the metal constituent of the thermally decomposable compound}}{\text{atomic weight of the metal}}}$$

DETAILED DESCRIPTION OF THE INVENTION

The high surface area catalysts of the present invention are made by utilizing a hydrocarbonaceous oil chargestock boiling at atmospheric pressure above about 221° C., preferably above about 260° C., more preferably above about 343° C. These hydrocarbon oils may be derived from any source such as petroleum, oil shale, tar sands and oils derived from coal liquefaction processes. The Conradson carbon residue of these oils will generally range up to about 50 weight percent, preferably below about 30 weight percent (as to Conradson carbon residue, see ASTM test D-189-65).

By way of example, suitable hydrocarbon oil chargestocks for the process of the present invention include virgin gas oil, vacuum gas oil, coker gas oil, visbreaker gas oil, petroleum distillates, white oils, hydrocarbon oils derived from coal liquefaction processes, coal liquefaction bottoms, synthetic polymer oils such as ethylene oligomers, synthetic and natural waxes, etc. Preferably, the oil is a mixture of hydrocarbons boiling at atmospheric pressure, in the range of about 343° to 565° C. More preferably, the hydrocarbon chargestock comprises at least 50 percent of the Conradson carbon in the form of a hydrocarbon stream comprising more than 1 weight percent Conradson carbon residue, such as residue, whole crudes, etc.

To the hydrocarbon oil chargestock is added a thermally decomposable metal compound, wherein the metal constituent is selected from the group consisting of Groups II, III, IV, V, VIB, VIIB, VIII and mixtures thereof of the Periodic Table of Elements. A sufficient amount of a single thermally decomposable metal compound or of a mixture of metal compounds is added to the oil to provide a ratio of atoms of Conradson carbon of the oil chargestock to atom of metal constituent of the thermally decomposable compound or compounds of less than about 750 to 1, preferably less than about 600 to 1, more preferably less than 100 to 1. Suitable ranges of ratio of atoms of Conradson carbon of the oil to atom of metal constituent of the thermally decomposable metal compound include an atomic ratio ranging from about 2 to 1 to about 600 to 1, preferably from about 2 to 1 to about 300 to 1, more preferably from about 4 to 1 to about 100 to 1. Thus, the amount of thermally decomposable metal compound added will vary depending on the Conradson carbon of the oil feed actually used so as to provide the ratio required to obtain high surface area catalytic solids.

Suitable thermally decomposable metal compound convertible (under preparation conditions) to solid, non-colloidal catalyst include (1) inorganic metal compounds such as carbonyls, halides, oxyhalides, poly acids such as isopoly acids and heteropolyacids (e.g., phosphomolybdic acid, and molybdosilicic acid); (2) metal salts of organic acids such as acyclic and alicyclic aliphatic carboxylic acids and thiocarboxylic acids containing two or more carbon atoms (e.g., naphthenic acid); aromatic carboxylic acids (toluic acid); sulfonic acids (e.g., toluenesulfonic acid); sulfinic acid; mercaptans; xanthic acids; phenols, di- and polyhydroxy aromatic compounds; (3) organometallic compounds such as metal chelates, e.g., with 1,3-diketones, ethylenediamine, ethylenediaminetetraacetic acid, phthalocyanines, etc.; (4) metal salts of organic amines such as aliphatic amines, aromatic amines and quaternary ammonium compounds.

The metal constituent of the thermally decomposable metal compound, that is convertible to a solid, non-colloidal catalyst, is selected from the group consisting of Groups II, III, IV, V, VIB, VIIB and VIII and mixtures thereof of the Periodic Table of Elements, in accordance with the table published by E. H. Sargent and Co., copyright 1962, Dyna Slide Co., that is, zinc, antimony, bismuth, titanium, cerium, vanadium, niobium, tantalum, chromium, molybdenum, tungsten, manganese, rhenium, iron, cobalt, nickel and the noble metals including platinum, iridium, palladium, osmium, ruthenium and rhodium. The preferred metal constituent of the thermally decomposable compound is selected fro the group consisting of molybdenum, tungsten, vanadium, chromium, cobalt, titanium, iron, nickel and mixtures thereof. Preferred compounds of the given metals include the salts of acyclic (straight or branched chain) aliphatic carboxylic acids, salts of alicyclic aliphatic carboxylic acids, heteropolyacids, carbonyls, phenolates and organoamine salts.

When the thermally decomposable metal compound is added to the hydrocarbonaceous chargestock, it first dissolves or disperses in the oil and subsequently, under catalyst preparation conditions herein described, is converted to a solid high surface area catalyst.

The oil chargestock comprising the thermally decomposable metal compound is heated at a temperature ranging from about 199° C. to about 571° C., preferably at a temperature ranging from about 260° C. to about 482° C., more preferably at a temperature ranging from about 316° C. to about 449° C., at a pressure of either atmospheric or superatmospheric, preferably at superatmospheric pressure in the presence of a gas selected from the group consisting of a hydrogen-containing gas, a hydrogen sulfide-containing gas, and a gas comprising hydrogen and hydrogen sulfide, preferably at least 50 psig of such gas. More preferably, the gas comprises hydrogen and hydrogen sulfide. The hydrogen sulfide may comprise from about 1 to 90 mole percent, more preferably from about 2 to 50 mole percent of the hydrogen-containing gas. Suitable total pressures in the catalyst preparation zone when the heating step is being conducted include a pressure ranging up to about 5000 psig, preferably a pressure ranging from about 100 to about 3000 psig. Suitable reaction times include from about 5 minutes to about 4 hours, preferably from about 10 minutes to 2 hours. Contact of the solution under catalyst preparation conditions in the reaction zone with the hydrogen sulfide containing gas converts the metal compound to the corresponding metal catalyst. The oil containing the solids is removed from the catalyst preparation zone. The solids may be separated from the oil by conventional means, for example, by settling or centrifuging or filtration of the slurry. The recovered solids are the high surface area catalysts of the present invention. The surface area of these catalysts will be at least about 50 m$^2$/g and range from about 60 to about 600 m$^2$/g, usually from about 100 to about 500 m$^2$/g. Generally, the high surface area catalysts of the present invention comprise at least 10 weight percent, preferably above about 20 weight percent, more preferably above about 40 weight percent of the metal constituent, calculated as elemental metal, corresponding to the metal constituent of the added thermally decomposable metal compound, said weight being based on the total high surface area catalyst. The catalyst of the present invention may be prepared either in a batch process or in a continuous type operation.

The solids that are recovered from the reaction product of the catalyst preparation zone are suitable as catalysts, catalyst components or catalyst supports for use in a number of chemical processes and hydrocarbon treating processes such as catalytic cracking, hydrogenation, hydrogen refining, hydrodesulfurization, hydrocracking, reforming, etc. especially for hydroprocesses. The term "hydroprocess" is intended herein to mean a process conducted in the presence of hydrogen in which the hydrocarbonaceous oil feed is either upgraded (refined) without substantial change in the boiling range of the oil or a process in which the hydrocarbonaceous oil is converted to lower boiling hydrocarbon products.

The operating conditions to be employed in the hydrocarbon treating processes are well known and will vary with the particular reaction desired. The following table summarizes typical reaction conditions in which the catalysts of the present invention can be utilized.

| Principal Reaction Desired | Temperature, °F. | Pressure, psig | Feed Rate V/V/Hr | Hydrogen Rate SCF/bbl |
|---|---|---|---|---|
| Hydrorefining | 500–800 | 50–2000 | 0.1–10 | 500–10,000 |
| Hydrodesulfurization | 600–850 | 600–3500 | 0.05–5 | 300–20,000 |
| Hydrocracking | 450–850 | 200–2000 | 0.1–10 | 500–10,000 |
| Catalytic Cracking | 700–1000 | 0–50 | 0.1–20 | 0 |
| Catalytic Reforming | 850–1000 | 50–1000 | 0.1–20.0 | 500–10,000 |

The feedstocks suitable for the treating process in accordance with the invention include any of the well known feeds conventionally employed in the desired treating processes. Suitable feedstocks for the hydrocarbon treating processes of the present invention include hydrocarbonaceous oils derived from any source such as petroleum, shale, tar sand, coal liquefaction processes. Typically, such feeds include naphthas, gas oils, atmospheric residua, vacuum residua, whole petroleum crude oils, including heavy crude oils, bitumen, etc.

The metal constituent or metal constituents of the solids of the present invention can be varied by using one or more initial thermally decomposable metal compounds which are subsequently thermally decomposed. Alternatively, the recovered solids may be used as support materials for known catalytic metal components. Thus, a recovered solid may be composited in a conventional manner with metal constituents that are known to catalyze a given process. The compositing of the solids with the additional catalytic agents may be performed by impregnating the recovered solids comprising one or more metal constituents with catalytic components or precursors in any conventional way, such as contact of the solids with a dissolved salt of the desired metal or metals or by a method such as disclosed in U.S. Patent 3,959,179.

The compositing of the recovered solids may be performed by depositing a desired catalytic metal component or precursor of a catalytic metal component of the surface of the solids, including contacting of the solids with vapor phase materials. Furthermore, physical mixtures of two or more different recovered solids may be used in certain processes, for example, a catalytic recovered solid having one or more metal constituents which is different from another recovered catalytic solid wherein different initial thermally decomposable metal compounds were used.

The catalyst of the present invention may be used in a moving bed, fixed bed, fluidized bed, ebullating bed, suspension (transferline) or in slurry processes.

DESCRIPTION OF THE PREFERRED EMBODIMENT

The preferred embodiment will be described with reference to FIG. 1.

Figure 1:
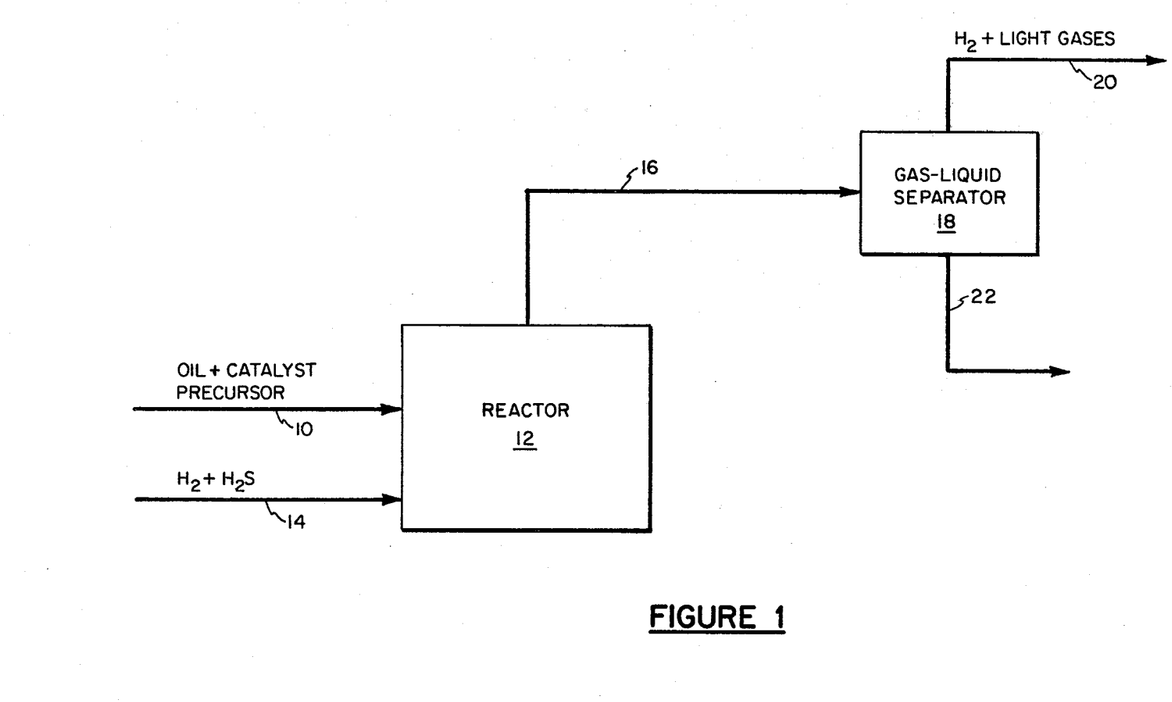
FIG. 1 is a schematic flow plan of one embodiment of the invention.

Referring to FIG. 1, a mixture of a gas oil feed having an atmospheric pressure boiling point of from about 343° C. to 565° C. and Cold Lake Crude containing an added thermally decomposable metal compound is introduced by line 10 into a catalyst preparation reaction 12 and maintained therein for 10 minutes to 2 hours. The ratio of atoms of Conradson carbon of the oil to atoms of metal constituent of the added thermally decomposable metal compound is between 5 to 1 and 100 to 1. The gaseous mixture comprising hydrogen and from about 2 to 50 mole percent hydrogen sulfide is introduced into reactor 12 by line 14. The catalyst preparation zone in reactor 12 is maintained at a temperature from about 316° to about 449° C. and at a pressure ranging from about 100 to 3000 psig. The reactor effluent is removed by line 16. The effluent comprises an oil, gases and a solid. The solid is the high surface area catalyst of the present invention. The surface area of the recovered catalyst ranges from about 100 to about 500 m²/g.

The effluent is introduced into a gas-liquid separator 18 where hydrogen and light hydrocarbons are removed overhead through line 20. The liquid stream containing dispersed catalyst solids is removed from separator vessel 18 via line 22. The catalytic solids are removed from the liquid stream 22 by conventional means such as centrifuging, settling, etc.

The following examples are presented to illustrate the invention.

EXAMPLE 1

A high surface area catalyst of the present invention is prepared as follows: A mixture of 17.3 grams of molybdenum naphthenate (6% molybdenum content) from Shepherd Chemical Company and 371.3 grams of light Arabian vacuum gas oil (0.46 Conradson carbon content) was charged to a 1 liter autoclave under 2000 psig of hydrogen pressure at room temperature. The autoclave was heated to 449° C. over a period of 93.8 minutes and held at this temperature for 28 minutes and cooled rapidly. The autoclave was vented and the liquid contents containing a solid precipitate was discharged. The solids were isolated by filtration, washed sequentially with toluene and hexane and dried under inert atmosphere. The solids weighed 1.88 grams and gave the analyses listed in Table I. The isolated solids comprise an embodiment of the high surface area catalysts of the present invention.

TABLE I

| Composition Element | Analysis*, wt. % | Atomic Ratio |
|---|---|---|
| Mo | 47.12 | 1.00 |
| S | 34.98 | 2.22 |
| C | 11.82 | 2.00 |
| H | 1.12 | 2.26 |
| Characteristics | | |
| Pore Volume, cc/g | | 2.1 |
| Surface Area, m²/g | | 335 |
| Pore Diameter, A | | 240 |

*X-ray pattern shows $MoS_2$

EXAMPLE 2 (Run 345)

A mixture of 90.5 g. of Light Arab vacuum gas oil (Conradson carbon content 0.46 wt. %) and 25.95 g. of molybdenum naphthenate (6.0% molybdenum content, obtained from The Shepherd Chemical Co.) was charged to a 300 cc stirred autoclave. The ratio of atoms of Conradson carbon to atoms of molybdenum in this mixture is 2.14. The air was flushed with hydrogen and the autoclave then pressured with 100 psia of $H_2S$ and 2000 psia of hydrogen at room temperature. The autoclave was heated at 725° F. for 30 minutes, cooled to room temperature, vented and the autoclave contents filtered to isolate a solid. The solid was washed on the filter paper with 0.8 l of hot toluene and then with 0.5 l of warm hexane to remove all adsorbed heavy hydrocarbons. The washed solid was then dried in an oil pump vacuum oven at 160° C. for 1 hr. The dried solids weighed 2.84 g. and contained 54.8% molybdenum, 7.36% C and 0.82% H. The surface area of this solid was 361 m²/g.

EXAMPLE 3 (Runs 329, 340, 344 and 354)

Experiments similar to Example 2 were carried out in which various portions of the gas oil were replaced by Cold Lake crude (Conradson carbon 12.8 wt. %) so as to adjust the ratio of atoms of Conradson carbon to molybdenum to 6.5, 34.8, 300 and 616. The surface areas of these solid products were respectively 356 m²/g, 281 m²/g, 153 m²/g and 64 m²/g. The carbon contents of these solids were 14.03%, 21.50%, 39.08%, and 49.10%, respectively. The molybdenum contents were 48.2%, 42.9%, 31.6% and 22.4%, respectively.

EXAMPLE 4 (Experiments 327 and 321)

Experiments similar to Example 3 were done in which no $H_2S$ was added to the autoclave. The Conradson carbon to molybdenum atom ratios were 6.5 and 8.9, and the surface areas obtained were 242 m²/g and 227 m²/g, respectively. The carbon contents of these solids were 16.60% and 16.35%, respectively. The molybdenum contents were 46.6% and 47.0%, respectively.

EXAMPLE 5

Figure 2:
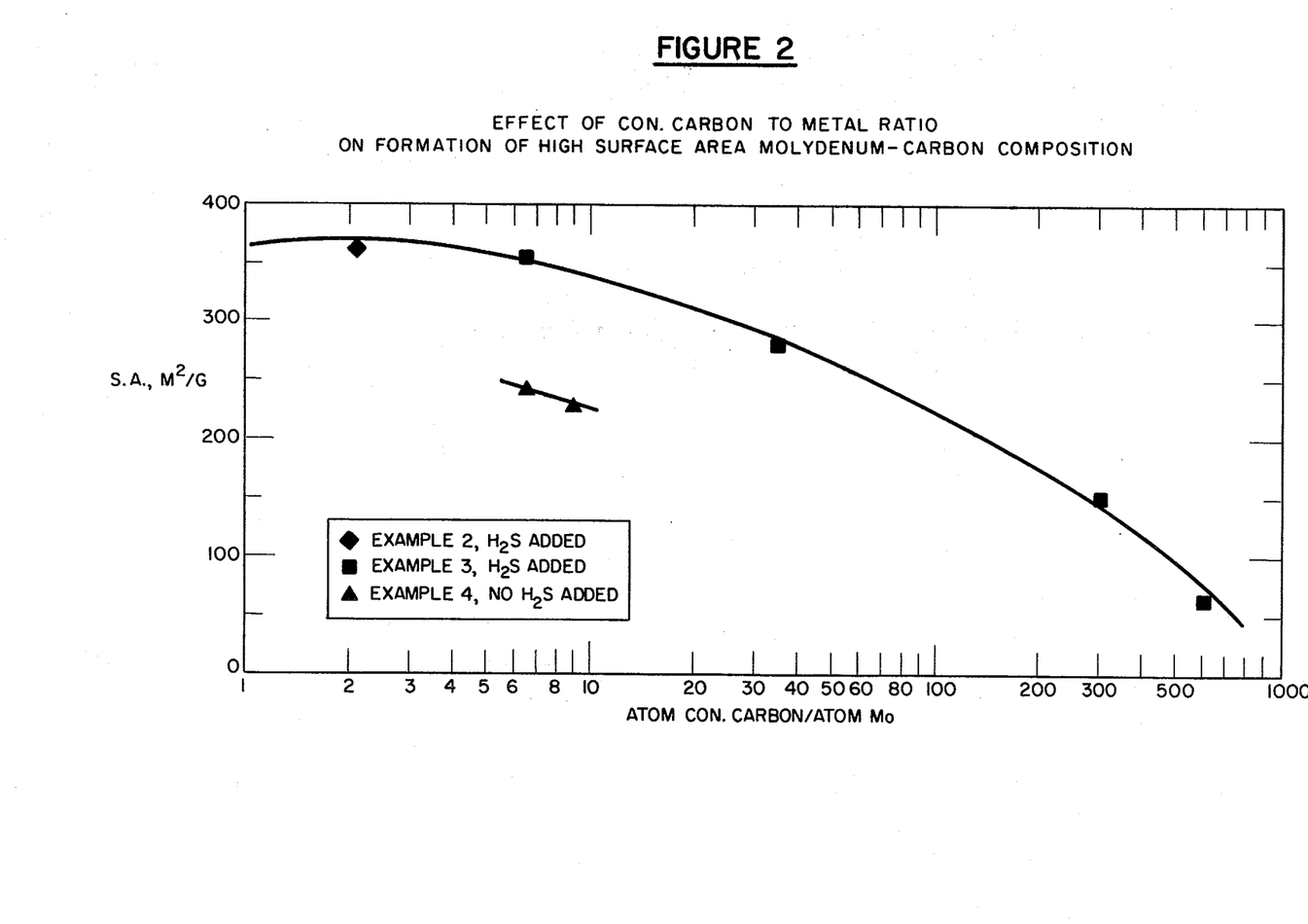
FIG. 2 is a graph showing the surface areas of the molybdenum-containing catalysts relative to the atomic ratio of Conradson carbon to metal constituent of the catalyst precursors.

The results of Examples 2, 3 and 4 were plotted in FIG. 2 and show that solids with surface areas greater than 50 m²/g are obtained when the Conradson carbon to metal atomic ratio in the feed mixture is less than about 750. It is also shown that the presence of $H_2S$ enhances the surface area obtained.

EXAMPLE 6 (Run 445)

A mixture of 88.4 g. of Light Arab vacuum gas oil (Conradson carbon content 0.46 wt. %), 3.1 g. of Cold Lake crude (Conradson carbon content 12.8 wt. %) and 25.95 g. of tungsten resinate (22.2 wt. % tungsten obtained from Engelhard Industries) was charged to a 300 cc stirred autoclave and the air flushed out with hydrogen. In this mixture the Cold Lake crude provided 50% of the Conradson carbon in the system, and the Conradson carbon to tungsten atomic ratio was 2.17. The autoclave was pressured to 100 psia with $H_2S$ and 2000 psia with $H_2$, heated at 725° F. for 30 minutes followed by 840° F. for 30 minutes. After cooling to room temperature, the reactor contents were washed out with toluene and filtered. The solids were washed with 0.8 l hot toluene and with 0.5 l warm hexane and oil pump vacuum oven dried at 160° C. for 1 hr. The dried solids weighed 9.69 g. and had a surface area of 144 m²/g, a carbon content of 9.48%, a hydrogen content of 0.69% and a molybdenum content of 59.7%.

EXAMPLE 7 (Runs 343, 355, 339, 337, 320, 416 and 417)

Experiments similar to Example 6 were done except that the atomic ratio of Conradson carbon to tungsten was progressively increased by reducing the amount of tungsten resinate charged and increasing the amount of Cold Lake crude charged. Results are tabulated below in Table II.

TABLE II

| | Charge | | | % of Con. Carbon from Cold Lake Crude | Con. C to Tungsten Atomic Ratio | Solids Properties | | | |
|---|---|---|---|---|---|---|---|---|---|
| Run No. | Gas oil, g. | Cold Lake Crude, g. | Tungsten Resinate, g. | | | S.A. m²/g | C, % | H, % | W, % |
| 343 | 81.45 | 9.05 | 25.95 | 76 | 4.2 | 169 | 9.47 | 0.80 | 57.8 |
| 355 | 100.2 | 11.2 | 11.2 | 76 | 11.9 | 203 | 12.10 | 0.70 | 66.4 |
| 339 | 100.2 | 11.1 | 7.0 | 76 | 19 | 200 | 11.87 | 0.82 | 68.5 |
| 337 | 100.2 | 11.1 | 2.80 | 76 | 47.6 | 197 | 13.07 | 0.82 | 62.8 |
| 320 | 100.2 | 11.1 | 1.40 | 76 | 95.2 | 165 | 18.04 | 1.49 | 54.5 |
| 416 | 67.6 | 43.7 | 1.40 | 95 | 300 | 102 | 37.05 | 2.15 | 42.6 |
| 417 | None | 111.3 | 1.40 | 100 | 725 | 21 | 57.3 | 3.07 | 23.7 |

EXAMPLE 8 (Run 318)

A run was made similar to Example 6 except no Cold Lake crude was added. The charge was 111.3 g. was oil and 1.40 g. of tungsten resinate. The Conradson carbon to tungsten atomic ratio was 25.2. The gas charged was 100 psia $H_2S$ and 2000 psia $H_2$. The recovered solids weighed 0.45 g. and had a surface area of 66 m²/g with a carbon content of 10.50% and hydrogen content of 1.28%. The tungsten content was 69.1%.

EXAMPLE 9 (Run 317)

A run was made similar to Example 8 except no $H_2S$ was added to the feed gas. The recovered solid weighed 0.46 g. and had a surface area less than 1 m²/g. The carbon content was 10.15% and hydrogen content was 1.05%. The tungsten content was 67.6%.

EXAMPLE 10

Figure 3:
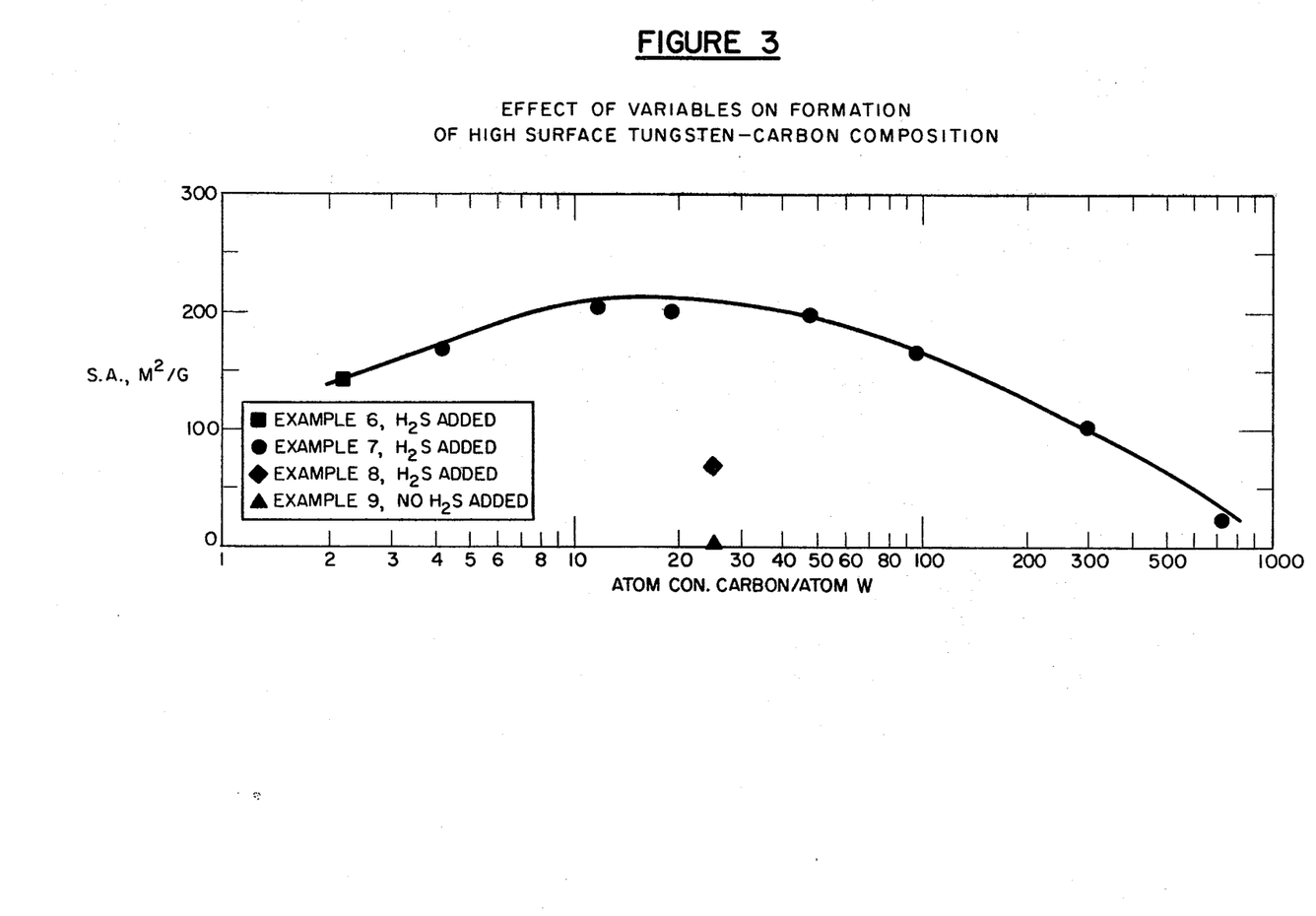
FIG. 3 is a graph showing the effect of preparation variables on the formation of tungsten-containing catalysts.

The results of Examples 6, 7, 8 and 9 are plotted in FIG. 3 and show the following: (1) higher surface area is obtained when more than 50% of the Conradson carbon is supplied by addition of a hydrocarbon component with greater than 1 Conradson carbon such as a resid or heavy crude, and (2) to obtain a tungsten containing solid with surface area greater than 50 m²/g, the Conradson carbon to tungsten atom ratio should be less than about 600/1.

EXAMPLE 11 (Runs 375A, 344, 329, 336)

Experiments were done at several temperatures (with sufficient holding at each temperature to insure completion of the reaction) to determine the preferred temperature for preparing the high surface area molybdenum-carbon composition. In each case the charge was 25.95 g. of molybdenum naphthenate, 83.8 g. of Light Arabian vacuum gas oil and 6.70 g. of Cold Lake crude. The Conradson carbon to molybdenum atom ratio for this mixture is 6.5. The gas charged was 100 psia $H_2S$ and 2000 psia $H_2$ at room temperature. Results are tabulated in Table III and show that 725° F. is about the optimum temperature.

TABLE III
EFFECT OF TEMPERATURE

| Run No. | 375A | 342 | 329 | 336 |
|---|---|---|---|---|
| Temperature, °F. | 390 | 600 | 725 | 840 |
| Time, Min. | 180 | 60 | 30 | 30 |
| Solid Product | | | | |
| Yield, g. | 2.90 | 3.66 | 3.23 | 3.39 |
| S.A., $m^2/g$ | 50 | 296 | 356 | 330 |
| C, % | 31.98 | 22.60 | 14.03 | 19.50 |
| H, % | 4.22 | 2.30 | 1.90 | 1.29 |
| Mo, % | 53.7 | 42.5 | 48.2 | 45.9 |

EXAMPLE 12 (Runs 333, 353, 332, 329, 404)

Experiments were done at 725° F. for 30 minutes using the charge mixture described in Example 11 to determine the importance of the gas composition and pressure. Results are tabulated in Table IV. These results show that a pressure of $H_2S$ or hydrogen is required to make the high surface area metal-carbon composition, and that it is preferably to have both $H_2$ and $H_2S$ pressure.

TABLE IV
EFFECT OF GAS COMPOSITION AND PRESSURE

| Run No. | 333 | 353 | 447 | 332 | 329 | 404 |
|---|---|---|---|---|---|---|
| $H_2$ Pressure Charged at Room Temp., psia | 0 | 2000 | 0 | 0 | 2000 | 500 |
| $H_2S$ Pressure Charged at Room Temp., psia | 0 | 0 | 50 | 100 | 100 | 100 |
| Solid Product (filterable) | | | | | | |
| Yield, g. | 0.00 | 3.00 | 4.23 | 4.00 | 3.23 | 3.61 |
| S.A., $m^2/g$ | — | 193 | 315 | 233 | 356 | 356 |
| C, % | — | 16.41 | 31.93 | 29.66 | 14.03 | 22.81 |
| H, % | — | 2.14 | 2.52 | 2.22 | 1.90 | 1.83 |
| Mo, % | — | 51.9 | 36.8 | 38.9 | 48.2 | 43.1 |

EXAMPLE 13

Experiments in gas oil medium only at 6.5 Conradson carbon to metal atomic ratio and at 725° F. for 30 min. with 2000 psia $H_2$ and no $H_2S$ charged at room temperature were performed with a variety of metals and metal combinations. Results are tabulated in Table V.

TABLE V
METAL SCREENING
2000 psia $H_2$ and 0 psia $H_2S$
Conradson Carbon Derived From Gas Oil

| Run No. | Metal Name | Added As | S.A., $m^2/g$ | C, % | H, % | Metal, % |
|---|---|---|---|---|---|---|
| 371 | Ti | Resinate | 142 | 7.41 | 1.52 | 74.6 |
| 369 | V | Naphthenate | 88 | 6.07 | 1.11 | — |
| 368 | Cr | Naphthenate | 431 | 28.63 | 4.54 | 33.0 |
| 370 | Fe | Naphthenate | No filterable solid | | | — |
| 372 | Co | Naphthenate | 2 | 2.16 | 0.54 | — |
| 316 | Ni | Naphthenate | 4 | 2.90 | 0.46 | 70.8 |
| 402 | Mo | Carbonyl | 117 | 13.08 | 1.29 | 82.4 |
| 396 | Fe/Mo* | Naphthenates | 232 | 9.51 | 1.50 | 54.7 |
| 398 | Co/Mo* | Naphthenates | 283 | 9.75 | 1.46 | 56.6 |
| 397 | Ni/Mo* | Naphthenates | 249 | 8.71 | 1.12 | 55.3 |

*35/65 atom ratio

EXAMPLE 14

Experiments were performed under the conditions of Example 13 except that 100 psia of $H_2S$ was added at room temperature. Results are tabulated in Table VI.

TABLE VI
METAL SCREENING
2000 psia $H_2$ and 100 psia $H_2S$
Conradson Carbon Derived From Gas Oil

| Run No. | Metal Name | Added As | S.A., $m^2/g$ | C, % | H, % | Metal, % |
|---|---|---|---|---|---|---|
| 376 | Ti | Resinate | 187 | 6.22 | 1.52 | 62.6 |
| 374 | V | Naphthenate | 69 | 5.98 | 1.19 | — |
| 373 | Cr | Naphthenate | 187 | 18.20 | 3.00 | 42.6 |
| 375 | Fe | Naphthenate | 11 | 4.20 | 1.17 | 93.7 |
| 377 | Co | Naphthenate | 49 | 3.33 | 0.68 | 59.4 |
| 378 | Ni | Naphthenate | 11 | 1.18 | 0.10 | 57.3 |
| 386 | Co/Mo* | Naphthenates | 173 | 43.59 | 2.57 | 25.3 |

*35/65 atom ratio.

EXAMPLE 15

Experiments were performed under the conditions of Example 14 except that Cold Lake crude was added to supply 69% of the Conradson carbon in the system, the other 31% being supplied by the gas oil. The Conradson carbon to metal atomic ratio was 6.4. Results are tabulated in Table VII.

TABLE VII
METAL SCREENING
2000 psia $H_2$ and 100 psia $H_2S$
31% of Conradson Carbon Derived From Gas Oil,
69% Derived From Cold Lake Crude

| Run No. | Metal Name | Added as | S.A., $m^2/g$ | C, % | H, % | Metal, % |
|---|---|---|---|---|---|---|
| 383 | Ti | Resinate | 137 | 7.16 | 1.03 | 58.1 |
| 381 | V | Naphthenate | 75 | 3.90 | 0.85 | — |
| 380 | Cr | Naphthenate | No filterable solid | | | — |
| 382 | Fe | Naphthenate | 5 | 3.40 | 0.43 | 84.6 |
| 347 | Co | Naphthenate | 70 | 4.17 | 0.93 | 59.0 |
| 379 | Ni | Naphthenate | 10 | 3.73 | 0.54 | 61.8 |
| 446 | Fe/Mo* | Naphthenates | 274 | 10.92 | 1.22 | 51.8 |
| 387 | Co/Mo* | Naphthenates | 320 | 14.94 | 1.65 | 48.1 |
| 405 | Ni/Mo* | Naphthenates | 200 | 10.92 | 1.25 | 49.2 |

*35/65 atom ratio.

EXAMPLE 16 (Run 340)

A mixture of 33.5 g. of molybdenum naphthenate (6 wt. % molybdenum content) and 66.5 g. of Cold Lake crude oil (13.22 wt. % Conradson carbon) was charged to a 300 cc stirred autoclave. This mixture had a Conradson carbon to molybdenum atomic ratio of 35 to 1. The autoclave was flushed with hydrogen and pressured to 100 psia with $H_2S$ then to 2950 psia with $H_2$. The autoclave was heated with stirring at 725° F. for 30 min. and 840° F. for 30 min. The average total pressure on reaction conditions was about 3000 psig. The reactor was cooled, discharged and the contents filtered. The solids were washed with hot toluene followed by hexane to remove adsorbed hydrocarbons, and then vacuum oven dried. The recovered solids weighed 4.69 g. The solids had a surface area of 281 $m^2/g$, a carbon content of 21.51 wt. %, a hydrogen content of 1.29 wt. % and a molybdenum content of 42.9 wt. %.

EXAMPLE 17

In this example the precursor used to form the high surface area molybdenum catalyst was phosphomolybdic acid (20 $MoO_3 \cdot 2H_3PO_4 \cdot 48H_2O$, supplied by J. T. Baker Chemical Company). The preparation was carried out as follows. To a 300 ml stirred autoclave, there was charged 91.64 g. of Light Arabian vacuum gas oil (0.46% Conradson carbon) and a solution comprised of 0.565 g. of phosphomolybdic acid in 1.695 g. of anhydrous isopropyl alcohol. The ratio of atoms of Conradson carbon to atoms of molybdenum in this mixture is 125/1. The autoclave was flushed with hydrogen and then pressured with 105 psia of $H_2S$ and 2000 psia of hydrogen at room temperature. The autoclave was heated at 725° F. for 30 minutes followed by a 30 minute period at 840° F. Upon cooling to room temperature, the autoclave was depressured and the liquid contents were discharged and filtered to isolate the solid product. Adhering oil was removed from the solids by washing sequentially with toluene and hexane. The washed solids were then dried at 80° C. in an oil pump vacuum oven. There was recovered 0.49 g. of dry solids which had a surface area of 123 $m^2/g$ and contained 56 weight percent molybdenum.

EXAMPLE 18

This example illustrates the use of a high surface area molybdenum catalyst and a cobalt impregnated high surface area molybdenum catalyst for the slurry hydrocracking of a Light Arabian vacuum gas oil.

(A) Preparation of Molybdenum Catalyst

The high surface area molybdenum catalyst was prepared as follows. A mixture of 86.5 g. of molybdenum naphthenate (6% molybdenum), 241.6 g. of Light Arabian vacuum gas oil (0.46% Conradson carbon content) and 60.7 g. of Cold Lake crude (12.8% Conradson carbon content) was charged to a one liter stirred autoclave and pressured with 2000 psia hydrogen at room temperature. The autoclave was heated over a period of 95 minutes to a run temperature of 840° F. and was held at this temperature for 28 minutes and then cooled rapidly to room temperature. The resultant solids, isolated by filtration, were washed with toluene and then with hexane prior to drying under vacuum. There was recovered 11.17 g. of molybdenum catalyst which exhibited a surface area of 244 $m^2/g$ and contained 49 wt. % molybdenum. This catalyst is designated hereinafter as Catalyst A.

(B) Preparation of Cobalt Impregnated Molybdenum Catalyst (Run 21-R-40)

A sample of 0.41 g. of catalyst A, high surface area molybdenum catalyst powder, was mixed with 1.17 g. of cobalt naphthenate (6% cobalt) in a 300 ml autoclave at room temperature. The reactor was flushed with hydrogen and then charged, at room temperature, with 200 psia hydrogen sulfide and 1300 psia hydrogen. Reactor temperature was raised to 662° F. over the course of 95 minutes and was held at 662° F.-678° F. for 30 minutes followed by rapid cooling to room temperature. The reactor was vented and flushed with nitrogen. Upon opening, it was observed that water and light hydrocarbons, resulting from the decomposition of cobalt naphthenate, had condensed on the upper surfaces of the reactor. These deposits were removed. The cobalt impregnated molybdenum catalyst, which was observed as a black powder on the bottom of the reactor, was not removed, but left in the reactor for a vacuum gas oil hydrocracking test. The atomic ratio of cobalt to molybdenum in the finished catalyst was 0.57. This catalyst is designated hereinafter as catalyst B.

(C) Vacuum Gas Oil Hydrocracking Runs

For the hydrocracking runs a 300 ml stirred autoclave was charged with catalyst and approximately 90 g. of a Light Arabian vacuum gas oil. See table for quantities charged. The autoclave was then flushed with hydrogen, charged with 2000 psia hydrogen at room temperature and heated over the course of 30 minutes to the run temperature of 840° F. After a reaction time of 30 minutes at 840° F. the reactor was cooled rapidly to room temperature and the contents were analyzed.

Hydrocracking results obtained with the high surface area catalysts are shown in Table VIII relative to the results obtained in a non-catalytic thermal hydrocracking run. As is apparent from the data, the high surface area catalysts gave hydrocracking results much superior to those obtained in the purely thermal conversion run. In particular, product desulfurization was much higher, product unsaturation was much lower (lower bromine numbers) and the 650° F. conversion product distillate to naphtha ratios were, desirably, higher.

TABLE VIII

| VACUUM GAS OIL HYDROCRACKING RUNS | | | |
|---|---|---|---|
| Run No. | 21-R-25 | 08-R-57 | 21-R-40 |
| Gas Oil Charged, g. | 94.95 | 92.20 | 92.43 |
| Catalyst | A | None | B |
| Charge, g. | 0.41 | | 0.41 g of Catalyst A + Cobalt |
| Conversion of 650° F.+ to 650° F.− Products, % | 44.8 | 59.7 | 54.3 |
| Sulfur Removed From Gas Oil, % | 61.0 | 5.4 | 86.0 |
| Bromine Number of Total Liquid Product | 3.9 | 16.6 | 1.6 |
| Weight Ratio of Distillate (355-650° F.) to Naphtha (i-355° F.) | 3.3 | 2.12 | 3.6 |
| $H_2$ Consumption, SCF/B of Feed | 501 | 553 | 651 |

EXAMPLE 19

This example shows the preparation of a cobalt promoted molybdenum catalyst (coprecipitated catalyst) from a blend of oil soluble cobalt and molybdenum compounds according to the practice of this invention. The procedure used was similar to that of Example 2. The ratio of atoms of Conradson carbon to the sum of the atoms of molybdenum and cobalt in this preparation was 6.5/1. From a reactor charge consisting of 102.8 g. of Light Arabian vacuum gas oil, 8.22 g. of Cold Lake crude, 6.92 g. of cobalt naphthenate (6% cobalt by weight) and 20.74 g. of molybdenum naphthenate (6% Mo by weight) there was recovered 3.11 g. of dry cobalt-molybdenum catalyst which exhibited a surface area of 253 $m^2/g$. This catalyst is designated hereinafter as catalyst C.

The catalysts' desulfurization activity was determined using the following procedure. To a 300 ml autoclave there was added the calcined, presulfided catalyst powder, typically about 0.6 g, and 92 g of light Arabian vacuum gas oil which contained 2.42 wt.% sulfur. The reactor was flushed with hydrogen and then charged at room temperature with 40 psia hydrogen sulfide and 2000 psia hydrogen. The reactor was heated as rapidly as possible (~25 minutes) to a temperature of 725° F., held there with stirring for 30 minutes and then the temperature was increased to 800° F. for a final 25 minute contact prior to cooling to room temperature. Reactor products were discharged and analyzed for sulfur content. As shown in Table IX the coprecipitated cobalt molybdenum catalyst (Run 60-R-15) had desulfurization activity superior to that of the non-promoted molybdenum catalyst of this invention (Run 21-R-57).

TABLE IX

| CORRECIPITATED COBALT-MOLYBDENUM CATALYST | | |
|---|---|---|
| Run No. | 60-R-15 | 21-R-57 |
| Cobalt Incorporated by: | Coprecipitation C | No cobalt |
| Co/Mo Atomic Ratio | — | No cobalt |
| Relative Desulf. Act. | 2.32 | 1 |

EXAMPLE 20

A sample of high surface area molybdenum-containing solid powder was prepared according to this invention and had the following properties; surface area 330 m²/g; C, 12.53 wt. %; H, 1.41 wt. %; Mo, 47.8 wt. %.

This powder was impregnated with cobalt as follows. To a charge of 6.06 grams of vacuum oven dried molybdenum catalyst powder contained in a 5″ diameter evaporating dish there was added dropwise, with stirring, 24.11 grams of a solution comprised of 7.4 wt. % cobaltous acetate tetrahydrate, 7.0 wt. % isopropyl alcohol and 85.6 wt. % deionized water. The amount of impregnation solution added was just sufficient to impart a glistening wet appearance to the powder. After a 15 minute drying period in a vacuum oven at 80° C., the solids were treated with the impregnation diluent (8 wt. % isopropyl alcohol + 92 wt. % water) to again reach the glistening wet surface appearance and then were dried a final time for 90 minutes at 80° C. in a vacuum oven. There was recovered 7.02 g. of cobaltous acetate impregnated molybdenum catalyst powder.

This cobalt impregnated powder was then pilled using bentonite as the binder in the proportion of 74 wt. % to 26 wt. % bentonite. The pills were cracked and screened to 12–48 mesh. The surface area of the finished catalyst was 180 m²/g. This catalyst is designated hereinafter as catalyst D.

Catalyst D was tested for desulfurization of vacuum gas oil in a continuous unit at 685° F., 1 V/V/Hr., 1500 psig $H_2$ pressure in direct comparison with a commonly used standard commercially available desulfurization catalyst (12–48 mesh). The catalyst of this invention was found to have an activity, on a catalyst volume equivalent basis, 68% greater than the given commercially available desulfurization catalyst, which itself is a high activity desulfurization catalyst.

EXAMPLE 21

A catalyst of the present invention, prepared with molybdenum naphthenate precursor, containing 47.6 weight percent molybdenum and having a surface area of 330 m²/g was blended with bentonite as a binder in a 71/29 weight ratio. The blend was pilled, cracked and screened to 12–48 mesh screen size. The resulting finished catalyst, hereinafter designated catalyst E, was tested for desulfurization of light Arab vacuum gas oil containing 2.34 weight percent sulfur at 1500 psig and 0.97 volumes of liquid feed per volume of catalyst per hour in a continuous unit. The results are summarized in Table X.

TABLE X

| Catalyst Age, Hr. on Oil | 209 | 425 |
|---|---|---|
| Temperature, °F. | 661 | 684 |
| $H_2$ Fed, SCF/Bbl. | 1683 | 2061 |
| Desulfurization, % | 69.9 | 83.7 |

What is claimed is:

1. A hydrocracking process which comprises contacting a hydrocarbonaceous oil feed in the presence of added hydrogen at hydrocracking conditions with a high surface area catalyst prepared by the steps which comprise:
   (a) adding to a hydrocarbon oil chargestock having a Conradson carbon content up to about 50 weight percent, a thermally decomposable metal compound in an amount sufficient to provide a ratio of atoms of oil chargestock Conradson carbon to atoms of metal constituent of said thermally decomposable metal compound of less than about 750 to 1, said metal constituent being selected from the group consisting of Group II, Group III, Group IV, Group V, Group VIB, Group VIIB and Group VIII of the Periodic Table of Elements and mixtures thereof;
   (b) heating said thermally decomposable metal compound within said chargestock at an elevated temperature in the presence of a gas selected from the group consisting of a hydrogen-containing gas, a hydrogen sulfide-containing gas, and a gas comprising hydrogen and hydrogen sulfide, to produce a solid high surface area catalyst within said chargestock, and
   (c) recovering said high surface area catalyst.

2. The process of claim 1, wherein said hydrocarbonaceous oil feed of said hydrocarbon treating process is selected from the group consisting of petroleum derived oils, tar sand oil, shale oil, liquid products derived from coal liquefaction processes, coal liquefaction bottoms, and mixtures thereof.

3. The process of claim 1 wherein said gas of step (b) comprises from about 1 to about 90 mole percent hydrogen sulfide.

4. The process of claim 1 wherein said thermally decomposable metal compound is selected from the group consisting of inorganic metal compounds, salts of organic acids, organometallic compounds and salts of organic amines.

5. The process of claim 1 wherein said thermally decomposable metal compound is selected from the group consisting of salts of acyclic aliphatic carboxylic acids and salts of alicyclic aliphatic carboxylic acids.

6. The process of claim 1 wherein said thermally decomposable metal compound is a salt of a naphthenic acid.

7. The process of claim 1 wherein the metal constituent of said thermally decomposable metal compound is selected from the group consisting of molybdenum, tungsten, chromium, vanadium, cobalt, titanium, iron, nickel and mixtures thereof.

8. The process of claim 1 wherein said thermally decomposable metal compound is molybdenum naphthenate.

9. The process of claim 1 wherein said thermally decomposable metal compound is phosphomolybdic acid.

* * * * *